G. A. HOLM.
CLEAN SWEEP REEL SLAT.
APPLICATION FILED JUNE 3, 1916.

1,196,237.

Patented Aug. 29, 1916.

Inventor
G. A. HOLM
H. S. Hill
Attorney

UNITED STATES PATENT OFFICE.

GUSTAF A. HOLM, OF POWERS LAKE, NORTH DAKOTA.

CLEAN-SWEEP REEL-SLAT.

1,196,237.          Specification of Letters Patent.          Patented Aug. 29, 1916.

Application filed June 3, 1916. Serial No. 101,537.

*To all whom it may concern:*

Be it known that I, GUSTAF A. HOLM, a citizen of the United States, residing at Powers Lake, in the county of Burke, State of North Dakota, have invented a new and useful Clean-Sweep Reel-Slat; and I do hereby declare the following to be a full, clear, and exact description of the invention, such as will enable others skilled in the art to which it appertains to make and use the same.

The present invention relates to certain new and useful improvements in the construction of slats or bars such as are used upon the reels of mowing machines and like implements, the object of the invention being to provide a device of this character which embodies novel features of construction whereby it will operate successfully upon short flax and other short grain under conditions where the plain wooden slat would not give satisfactory results.

Further objects of the invention are to provide a reel slat of this character which is comparatively simple and inexpensive in its construction, which can be used interchangeably with the ordinary wooden slats, which can be quickly placed in position upon a reel or removed therefrom, and which will operate successfully upon short flax and short grain.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1:
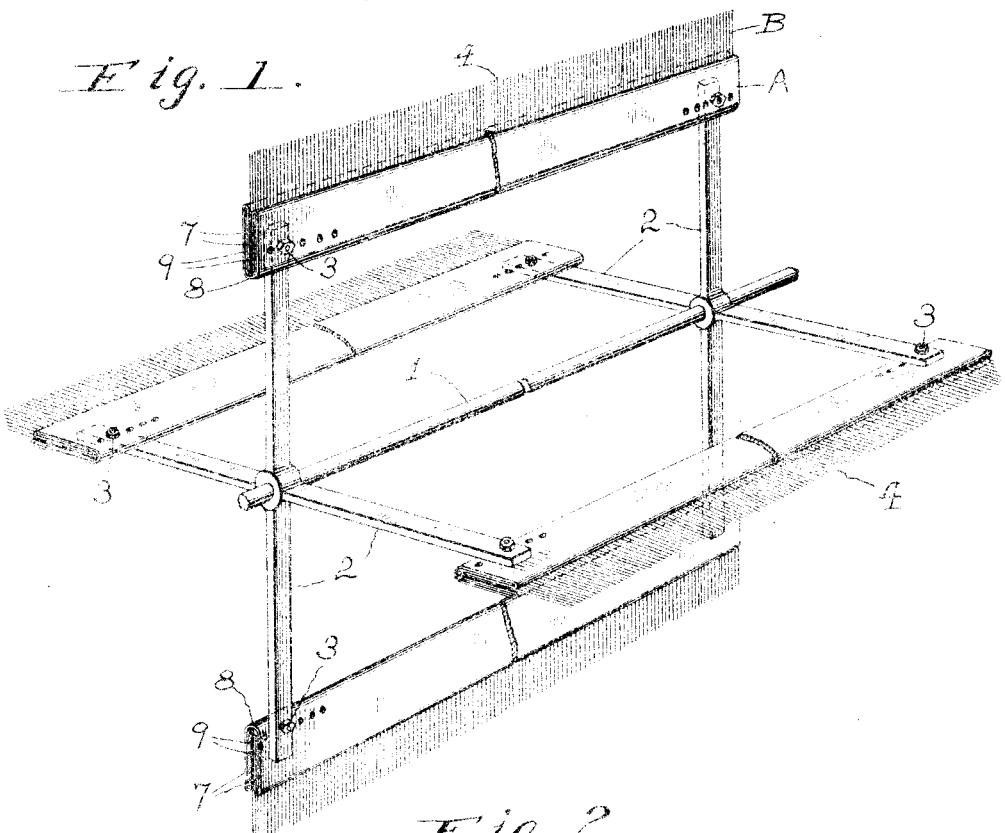
Figure 2:
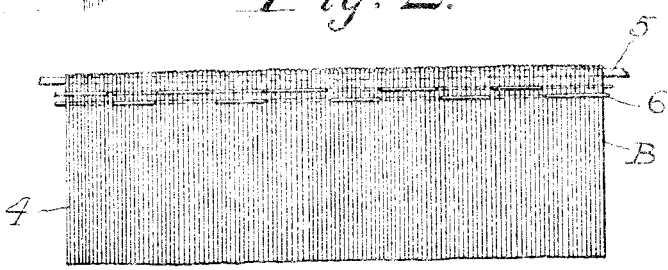
Figure 3:
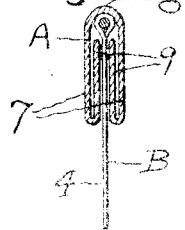

Figure 1 is a perspective view of a reel constructed in accordance with the invention, portions being broken away. Fig. 2 is a plan view of a portion of one of the brush units. Fig. 3 is a transverse sectional view through one of the slats.

Corresponding and like parts are referred to in the following description and indicated in all the views of the drawing by the same reference characters.

Referring to Fig. 1 of the drawings, the numeral 1 designates the shaft of an ordinary reel, such as are commonly used upon mowing machines and binders, and 2 the radial arms which project from opposite ends of the shaft and have the slats mounted upon the extremities thereof. Detachable fastening means, such as the bolts 3, are employed for securing the slats in position, and the present slats are designed to be used interchangeably with the ordinary wooden slats, the former being used for short flax and short grain, while the latter would be used upon the ordinary lengths of grain.

Each of the slats includes a strip A which is secured to the arms 2 of the reel, and a brush element B which extends the full length of the strip and projects from one of the longitudinal edges thereof. Such a reel slat can be set low enough to give excellent results when used in connection with short flax and short grain, at the same time keeping the guards of the mower clear. The brush element B is formed of broom corn or the like, the various fibers 4 being doubled around a wire 5 which extends along the back of the brush element, and being stitched at 6 adjacent the wire 5. The brush element thus formed can be easily handled and readily cut up into the proper lengths for application to the strips A.

Each of the strips A is formed of a length of sheet material which is doubled transversely to provide spaced and opposed plates 7 connected by a curved back 8. The free edges of the side plates 7 are returned inwardly at 9 and terminate short of the back 8, said returned portions providing spring jaws which bear against and grip the fibers 4 of the brush element B at the bases of the fibers. The back of the brush element B fits against the curved back 8 of the strip A, ample clearance space being provided for the said back by reason of the fact that the returned edges or jaws 9 of the side plates 7 terminate short of the back 8 of the strip. The side plates 7 can be sprung apart the necessary amount to admit of the brush elements B being readily placed in position or removed therefrom, and said side plates are provided at points toward opposite ends of the strip with the openings 10, any selected pair of the openings being adapted to be engaged by the bolts 3 when applying the slats to the radial arms of the reel, depending upon the size of the reel to which the slats are being affixed. The inherent resiliency of the side plates 7 and spring jaws 9 is ordinarily sufficient to grip the brush elements, although it will be understood that when the bolts 3 are tightened, the side plates and spring jaws are brought forcibly together, so that it is impossible for the brush elements to become loose while the reel is in operation. These slats can be readily substituted for the ordinary wooden slats upon the reel of any binding machine or mower, and the machine can then be used upon short flax and short grain with satisfactory results, under conditions where it would be impossible to get any satisfaction when using a reel provided with the ordinary wooden slats.

Having thus described the invention, what I claim as new and desire to secure by Letters Patent, is:—

1. A reel slat including a body formed of a strip of sheet metal which is doubled upon itself transversely to provide spaced and opposed side plates, the edges of the side plates being returned inwardly to provide spring jaws, and a longitudinally extending brush element received between the side plates and gripped by the spring jaws, said brush element projecting from one of the longitudinal edges of the body.

2. A reel slat including a body formed of a strip of sheet metal which is doubled upon itself transversely to provide spaced and opposed side plates, the edges of the side plates being returned inwardly to provide spring jaws, and a longitudinally extending brush element formed with a wire back having fibers doubled around the same, said brush element being received between the side plates and gripped by the spring jaws, the fibers of the brush element projecting from one of the longitudinal edges of the body.

In testimony whereof I have signed my name to this specification in the presence of two subscribing witnesses.

GUSTAF A. HOLMSTED

Witnesses:
N. J. THOMSON,
E. N. RODENHIZER.